United States Patent [19]
Wallner

[11] Patent Number: 5,696,909
[45] Date of Patent: Dec. 9, 1997

[54] VIRTUAL POS TERMINAL

[75] Inventor: George Wallner, Phoenix, Ariz.

[73] Assignee: Hypercom, Inc., Phoenix, Ariz.

[21] Appl. No.: 379,734

[22] Filed: Jan. 27, 1995

[51] Int. Cl.$^6$ .............. G06F 17/60; G06G 7/52; H04M 11/00
[52] U.S. Cl. .............. 395/244; 395/242; 379/93; 379/95; 235/379; 235/380; 340/825.33
[58] Field of Search .............. 379/91, 92, 93, 379/94, 95, 88, 144, 67, 112, 89; 235/379, 380–382, 492; 340/825.33, 825.3, 825.08, 825.5; 364/401, 405, 406, 408; 370/95.1, 95.2, 85.8, 85.6; 395/239, 242, 243, 244

[56] References Cited

U.S. PATENT DOCUMENTS

| | | |
|---|---|---|
| 4,623,964 | 11/1986 | Getz et al. . |
| 5,239,573 | 8/1993 | Rangan ........................ 379/88 |
| 5,448,471 | 9/1995 | Deaton et al. ............... 364/401 |
| 5,457,305 | 10/1995 | Akel et al. ................... 235/379 |
| 5,484,988 | 1/1996 | Hills et al. .................... 235/379 |
| 5,500,890 | 3/1996 | Rogge et al. ................. 379/91 |

FOREIGN PATENT DOCUMENTS

| | | |
|---|---|---|
| 0 440 515 A1 | 8/1991 | European Pat. Off. . |
| 0 658 862 A2 | 6/1995 | European Pat. Off. . |
| 2139457 | 11/1984 | United Kingdom . |
| WO 95/19010 | 7/1995 | WIPO . |
| WO 95/22113 | 8/1995 | WIPO . |

*Primary Examiner*—Curtis Kuntz
*Assistant Examiner*—Paul Loomis
*Attorney, Agent, or Firm*—Snell & Wilmer L.L.P.

[57] ABSTRACT

The present invention includes the hardware and software necessary to perform virtually any volume of complex transactions, and particularly a large volume thereof, is disposed in a central Application Processing Front End (APFE) which is shared by a plurality of merchants, thereby spreading the cost of the APFE among a large number of users. By including only the minimum amount of hardware components in the POS terminals, such terminals may be made available to low volume users on a cost-effective basis. In the present invention, the APFE logical module is interposed between the POS terminal and the host computer. In one embodiment of the present invention, the APFE comprises a separate hardware module interposed between the POS terminal and the host computer; in an alternate embodiment, the APFE corresponds to a software module resident within the host. The APFE unit includes the sophisticated hardware, software, memory, and other computing components necessary to implement a large volume of sophisticated transactions quickly and efficiently. The POS terminals which interface with the APFE, on the other hand, include only the minimum amount of hardware and software necessary to perform a desired level of functionality.

19 Claims, 5 Drawing Sheets

VIRTUAL POS TERMINAL

TECHNICAL FIELD

The present invention relates, generally, to methods and apparatus for effecting financial and commercial transactions from a substantially "dumb" remote transaction terminal (e.g., POS device) and, more particularly, to a system wherein the POS device transmits and receives discrete data fields from a front end application processor configured to serve a plurality of such dumb terminals, such that a substantial portion of the functionality of the POS terminals resides in the front end processor remote from the POS device.

BACKGROUND ART AND TECHNICAL PROBLEMS

Point of Service (POS) terminals of the type typically used by merchants permit holders of charge cards, credit cards, and the like to make electronic payments for services and merchandise quickly and easily. With the advent of stored value cards and other smart card schemes, the use of POS devices in some form is likely to increase dramatically over the next few decades. Indeed, as the feature set of POS terminals and associated peripheral devices increases, the use of POS terminals may largely supplant or even replace the use of cash and checks in many contexts.

Presently known POS terminals generally include at least a minimum set of features and capabilities to perform satisfactorily in a typical merchant environment. For example, it is desirable that a POS terminal have the capability of constructing a "message" comprising a predetermined number of fields; the message is typically transmitted over conventional telephone lines to a host computer which processes the message and returns a response message to the POS, for example a message authorizing or denying a particular sales transaction, authorizing the disbursement of cash, or the like.

In addition, known POS terminals desirably exhibit the ability to "settle," or otherwise reconcile, a day's transactions for a particular merchant for accounting purposes.

As the complexity of commercial transactions has increased, so has the complexity of presently known POS terminals. Consequently, the processing power, memory, ability to accommodate peripheral devices, and other aspects of the POS terminal have also grown more and more complex. For merchants who perform a high volume of POS transactions, e.g., on the order of several hundred or even several thousand transactions per week, the cost savings and accounting efficiencies derived from the use of sophisticated POS terminals can be significant, thus justifying the costs associated with these sophisticated and expensive POS terminals.

Merchants who perform a relatively low volume of POS transactions, for example on the order of 50 transactions per week, on the other hand, are not necessarily well served by investing a substantial amount of money in a sophisticated POS terminal which is used relatively infrequently. Such low volume merchants are thus reluctant to make a substantial investment in a sophisticated POS terminal; as a result, these merchants tend to utilize relatively unsophisticated, inexpensive POS terminals. However, because of the low transaction volume, the merchants typically lack familiarity with the POS transaction process, and may thus require substantial support and maintenance from the host providers of the POS terminals. The costs to the POS network provider of such support and maintenance can be substantial. To reduce the need for support, many low volume merchants are equipped with easy to use, relatively expensive and sophisticated terminals.

A POS system which addresses the foregoing and other shortcomings of the prior art, and which also reduces cost for many POS users, is thus needed.

SUMMARY OF THE INVENTION

The present invention provides a system of POS terminals which overcomes the shortcomings of the prior art. More particularly, in accordance with one aspect of the present invention, an Application Processing Front End (APFE) logical module is interposed between the POS terminal and the host computer. In one embodiment of the present invention, the APFE comprises a separate hardware module interposed between the POS terminal and the host computer; in an alternate embodiment, the APFE corresponds to a software module resident within the host. The APFE unit includes the sophisticated hardware, software, memory, and other computing components necessary to implement a large volume of sophisticated transactions quickly and efficiently. The POS terminals which interface with the APFE, on the other hand, include only the minimum amount of hardware and software necessary to perform a desired level of functionality. For example, the hardware and software associated with generating the various user prompts at the POS may suitably reside in the APFE. Alternatively, an intermediate level of hardware and/or software may reside in the POS device, with the remaining functionality being disposed in the APFE. For example, hardware and software sufficient to support a small number of "preloaded" initial prompts may reside in the POS device, with the more sophisticated functionality being directed from the APFE.

In accordance with a further aspect of the present invention, the message building capability typically resident in known POS terminals is desirably located at the APFE unit, thereby conserving the nature and extent of the hardware and software located in the POS terminal.

By including only the minimum amount of hardware components in the POS terminals, such terminals may be made available to low volume users on a cost-effective basis. In this way, the hardware and software necessary to perform virtually any volume of complex transactions, and particularly a large volume thereof, may be disposed in the central APFE which is shared by a plurality of merchants, thereby spreading the cost of the APFE among a large number of users.

BRIEF DESCRIPTION OF THE DRAWING FIGURES

The subject invention will be hereinafter described in conjunction with the appended drawing figures, wherein like numerals denote like elements, and.

DETAILED DESCRIPTION OF PREFERRED EXEMPLARY EMBODIMENT

Figure 1:
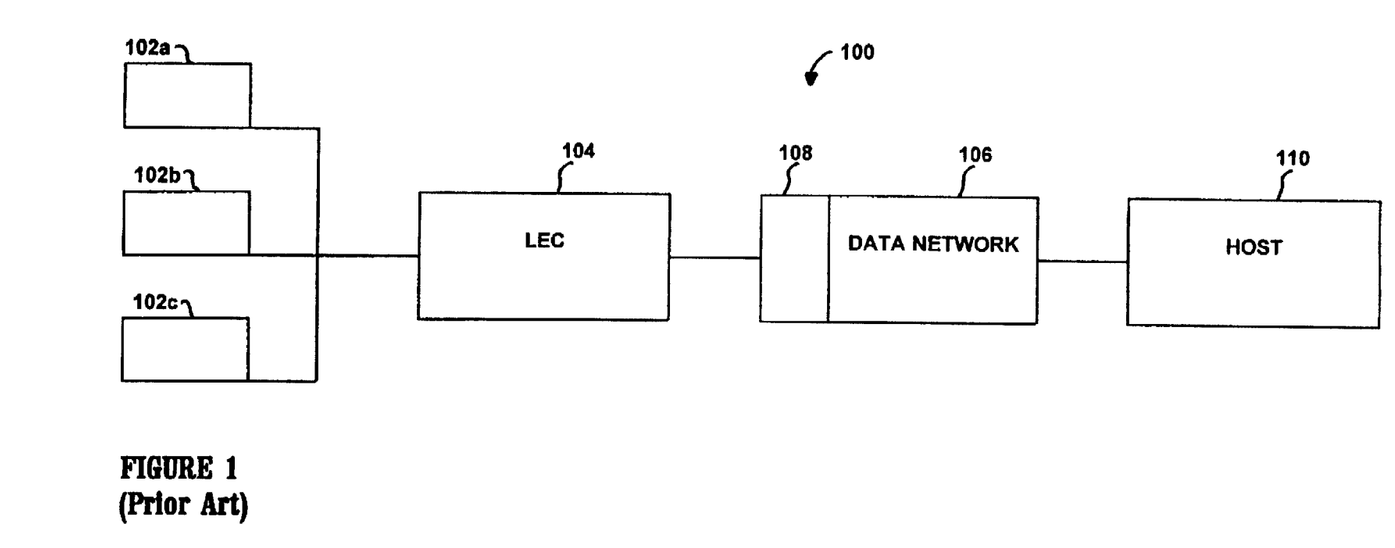
FIG. 1 is a schematic block diagram of a prior art POS terminal scheme.

Referring now to FIG. 1, an exemplary arrangement of a typical prior art POS/host system 100 typically includes a plurality of POS terminals 102, a local exchange carrier (LEC) 104, a data network 106 including access devices (e.g., modems) 108 and associated concentrators (not shown), and a host computer 110.

More particularly, each POS terminal 102 is suitably located at a merchant, for example a provider of products or services to the consuming public or a relevant sector thereof. Thus, a first POS terminal 102a may be disposed at a restaurant, whereas POS terminal 102b may be disposed at a sporting goods store, with various other POS terminals being disposed at a wide variety of commercial establishments who desire to effect commercial and/or financial transactions through the use of credit cards, debit cards, charge cards, and the like.

Data network 106 may encompass a relatively small geographic territory, for example a Local Area Network (LAN), a Wide Area network (WAN), or the like. Exemplary small scale data networks of this type include universities, companies having several related operating centers within a fairly narrow geographic radius, a plurality of banks operating under a common data network, and the like. Alternatively, many data networks cover very large geographic areas, for example regional, national, and global networks operated by AT&T, MCI, CompuServe, and various other network administrators.

When a merchant desires to effect a financial transaction through the use of POS terminal 102, he enters the transaction details into the terminal. The POS terminal is configured such that a modem resident therein dials a predetermined phone number to establish communication with host 110. More particularly, LEC 104 routes the telephone call to data network 106, whereupon a data link is established between terminal 102 and modem 108. Thereafter, host 110 is accessed, establishing a bi-directional data communication link between POS terminal 102 and host 110.

Once a data link is established between terminal 102 and host computer 110, terminal 102 typically transmits a message to the host to effect a desired transaction. Such messages may include a header portion which includes, inter alia, routing information; an application data portion which includes the data content of the message; and an end of message portion which indicates to the host that the message is complete.

Depending on the nature of the transaction which the merchant desires to effect, the message may take various forms; for example, a request for authorization, authorization advice, a financial transaction, financial transaction advice, file update or file transfer, transaction reversal, a card acceptor reconciliation request, or a network management request.

Upon determining the appropriate answer to the message transmitted from POS terminal 102, host computer 110 transmits a response message back to the terminal via the data link comprising data network 106 and LEC 104.

In accordance with a preferred exemplary embodiment of the present invention, a POS terminal 102 suitably includes the basic hardware components necessary to permit the POS terminal to communicate with a host computer (or an APFE unit), and the necessary user interfaces, such as display screens, key pads, and printers that allow the transaction details to be entered into and the response read from the POS device.

Figure 2:
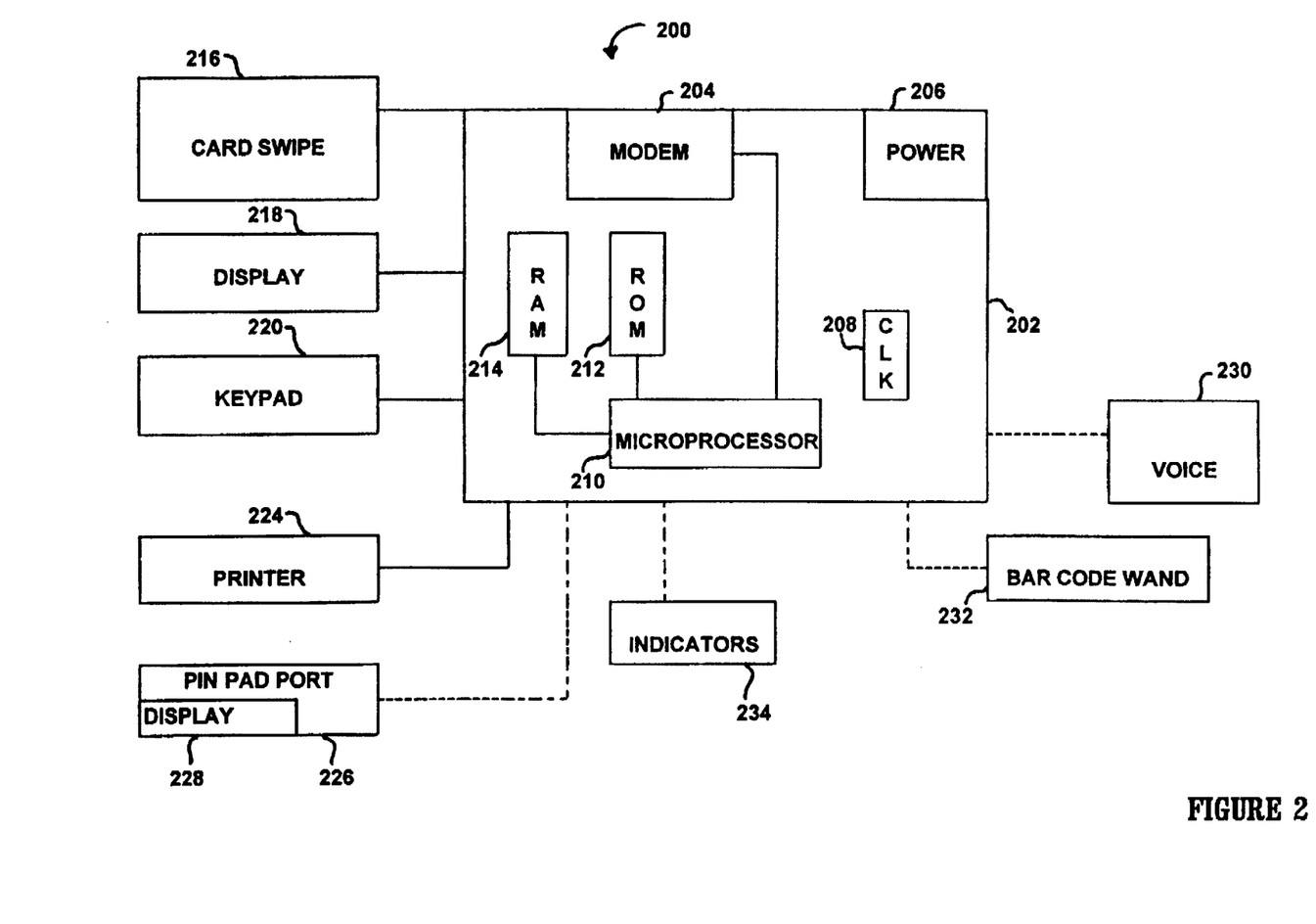
FIG. 2 is a schematic block diagram of a POS terminal in accordance with a preferred embodiment of the present invention.

Referring now to FIG. 2, an exemplary POS terminal useful in the context of the present invention suitably includes a housing 202, for example a conventional POS housing used in prior art terminals, such as model number T7P available from Hypercom, Inc. of Phoenix, Ariz. Housing 202 suitably encloses a modem circuit 204, a power supply circuit 206, an internal clock 208, a microcontroller or microprocessor 210, ROM 212, and a RAM 214. In addition, a plurality of external peripheral devices are configured to operate in conjunction with POS terminal 200, including a card swipe module 216, a display module 218, a key pad module 220 and a printer 224.

Suitable POS housings useful in the context of the present invention may, alternatively, incorporate certain "peripheral" devices into the body of the housing. For example, a printer module may be suitably integral with the housing, such that printed receipts and transaction records may be printed and dispensed directly from the POS housing unit. Typical housing units may be of any suitable shape, and are preferably generally on the order of approximately 100 to 400 millimeters in length, 40 to 200 millimeters in width, and approximately 10 to 200 millimeters in height, and most preferably approximately 110 millimeters in width, 200 millimeters in length, and 40 millimeters high.

More particularly, microcontroller 210 may comprise any suitable microcontroller or microprocessor capable of implementing the relatively simple functionality required by terminal 200, for example, a Z80 microprocessor available from Zilog. Controller 210 includes the basic operating software for terminal 200 to facilitate the entry and transfer of data between terminal 200 and its APFE and/or host, as described in greater detail below.

Power circuit 206 suitably comprises an AC power connector as well as a battery; in accordance with one aspect of the present invention, a battery backed RAM is particularly useful in ensuring a nonvolatile RAM 214.

ROM 212 suitably comprises a nonvolatile memory, for example an EPROM or EEPROM.

Clock 208 may be either separate from, or integral with, Controller 210 and is suitably configured to coordinate the timing of the various processes controlled by microcontroller 210.

Modem 204 may comprise any suitable modem circuit capable of dialing a telephone number upon request. A suitable modem circuit supports one or more of the commonly used modem standards, such as Bell 212A or VDOT 22b is and consists of either discrete components or an integrated circuit, such as a 73K222 available from Silicon Systems, Inc. During the operation of terminal 200 and as discussed in greater detail below, one or more destination telephone numbers are suitably stored in RAM 214, such that modem 204 places an outgoing telephone call to one of the telephone numbers stored in RAM 214 upon a request from Controller 210 to do so. In this regard, it may be desirable to store a plurality of telephone numbers within RAM 214, for example to permit the unit to scroll to an available destination (host) telephone number in the event the initial and/or subsequent telephone numbers are busy when a call is initiated. This avoids the delay associated with redialing the same or a different number in the event the initially desired host telephone number is busy. Moreover, depending on the particular transaction desired to be effected. Controller 210 may retrieve one of a plurality of telephone numbers from RAM 214, for example a telephone number corresponding to an American Express™, VISA™, Mastercard™, or other host. Alternatively, the telephone number may also correspond to a telephone number associated with a bank, travelers check company, or the like.

The precise configuration of terminal 200 may vary in accordance with the desired functionality of the device; hence, one or more peripheral devices may also be associated with terminal 200. More particularly, card swipe circuit 216 may comprise a single track or dual track card reader configured to dynamically receive a transaction card which is slid therethrough by the merchant. In addition, card swipe circuit 216 may also comprise a "smart card" receptor to accommodate smart cards, stored money cards, and the like.

Display 218 suitably comprises a two-line, twenty-character LCD, although it will be appreciated that display 218 may take any desired form which permits unit 200 to conveniently prompt the merchant (or other user) to interact with the device.

Key pad 220 suitably comprises a plurality of keys, e.g. sixteen, including the numbers 0–9, ENTER, CLEAR, RESET, CANCEL, BACKSPACE, and FUNCTION. It will be appreciated, however, that any combination of the above keys alone or in conjunction with other keys not specifically set forth herein may also be employed in the context of the present invention.

As one of the advantages of the POS terminal of the present invention surrounds its simplicity and hence low cost, it may be desirable in certain applications to limit the hardware associated with terminal 200 to only that hardware minimally necessary to effectively interface with the user and to communicate with the host.

Alternatively, one or more additional features may also be used in connection with terminal 200, including a printer 224, a PIN pad port 226 including a PIN display 228, a voice circuit 230, a bar code reader 232, and various indicators 234. More particularly, printer 224 may comprise any suitable printer, for example a printer configured to generate a customer receipt or other transaction record. In accordance with one aspect of the present invention, printer 224 suitably comprises a model M 192 available from the Epson Corporation.

PIN pad port 226 is advantageously configured to connect to any suitable device for permitting a consumer to interact with terminal 200, for example under circumstances where the consumer desires to enter a consumer PIN in a manner which cannot be conveniently observed by the merchant. By placing PIN pad port 226 where it may be conveniently viewed by the purchaser, the user may enter his PIN freely without being observed by the sales person. Display 220 is conveniently disposed to prompt the purchaser to enter his PIN at the appropriate point in the processing algorithm.

Voice circuit 230 may also be included to permit the user to talk to a human agent via a telephone call. In addition, circuit 230 may be configured to permit terminal 200 to respond to various voice prompts. In addition, bar code reader 232 may be desirably employed to permit the entry of data and information which may be encoded in bar code form.

Various indicator lights 234 may be suitably employed as user prompts, indicators of status such as OFF, ON, and WAIT indicators, as desired.

Figure 3:
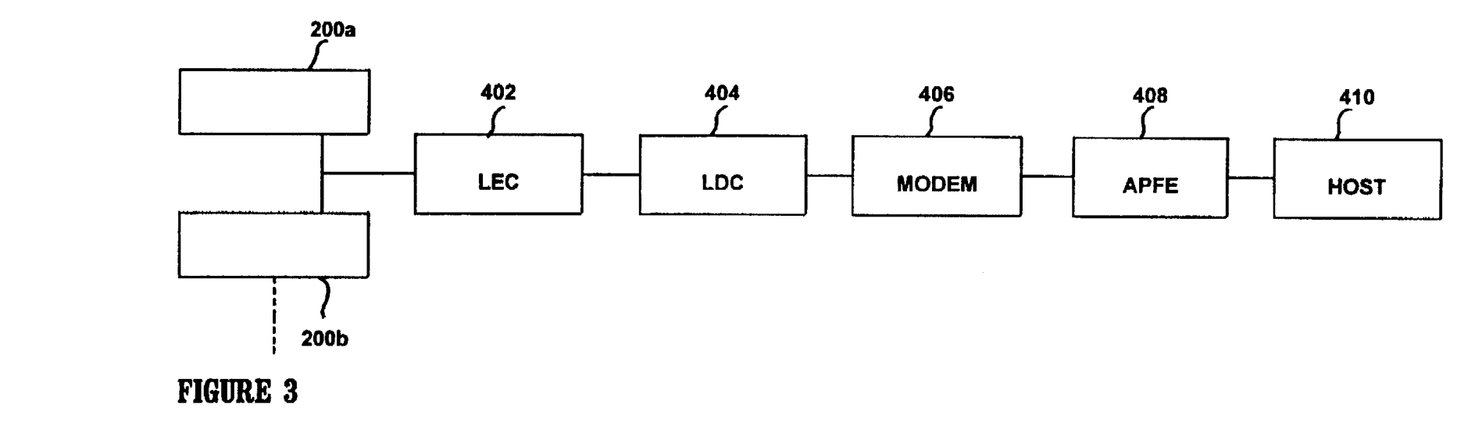
FIG. 3 is a schematic block diagram of a telephone network/data network link between the POS terminal of FIG. 2 and a host computer.
Figure 4:
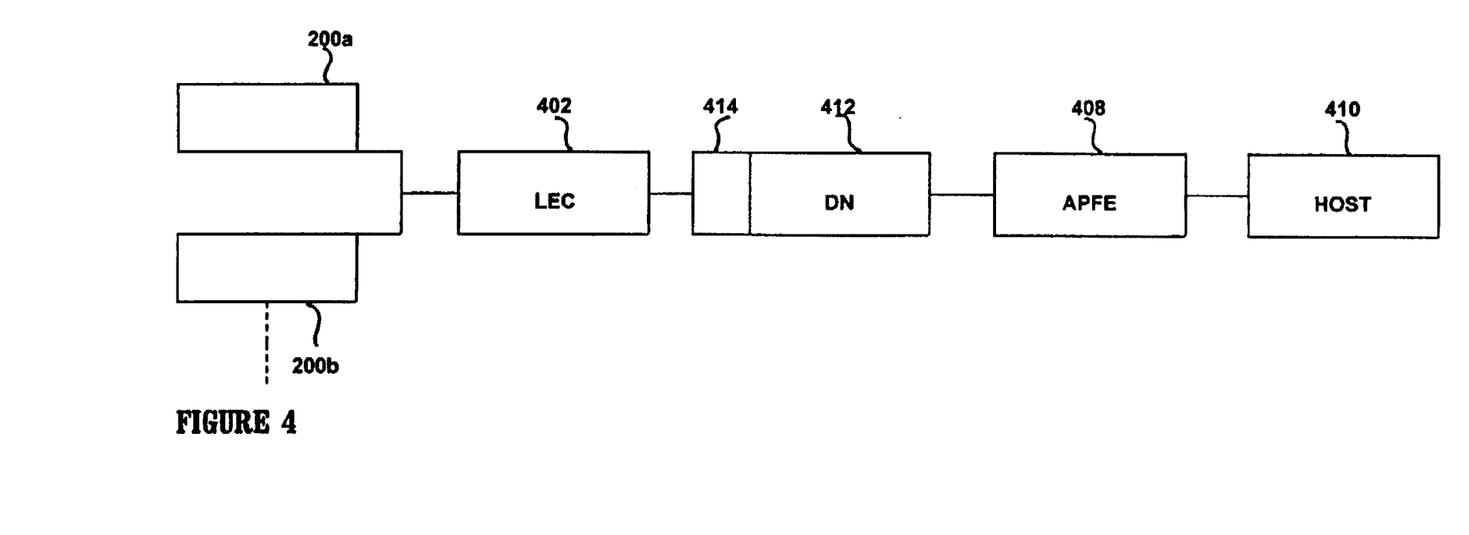
FIG. 4 is an alternative embodiment of the telephone/data network link shown in FIG. 3.

Referring now to FIGS. 3 and 4, one or more terminals 200 may be arranged to selectively communicate with a host computer, with the various terminals 200 being disposed in the manner analogous to the POS terminals described in connection with FIG. 1.

With particular reference to FIG. 3, terminal 200 is configured to establish communication with a host computer 410 through a data link comprising LEC 402, a Long Distance Carrier (LDC) 404, modem 406, and APFE 408. Specifically, when the modem resident within terminal 200 dials up the desired telephone number, the call is routed by LEC 402 to the appropriate telephone number destination. To the extent this requires or otherwise involves the use of a long distance carrier, the call may be routed from LEC 402 to host 410 via LDC 404. As briefly discussed above, APFE 408 may comprise a standalone hardware unit, for example a conventional personal computer or other computing device configured to perform the functions discussed herein; alternatively, APFE 408 may comprise a logical software node integral with host computer 410. In any event, in order to establish data communication between the telephone network and host computer 410, modem 408 (or other suitable interface) is conveniently interposed between the telephone network (e.g., LEC 402 or LDC 404) and the host computer.

In the alternate embodiment shown on FIG. 4, data communication is established between terminal 200 and host 410 (or APFE 408 as discussed above in connection with FIG. 3) via LEC 402 and a data network (DN) 412. More particularly and as briefly discussed above, local, regional, national, and global data networks exist which permit a call to be routed from LEC 402 to host 410 in a manner which reduces or even avoids the need for the merchant to place a long distance call in order to communicate with a remote host computer. That is, for a data network covering a large geographic area, terminal 200 need only contact a local telephone number proximate terminal 200, and thereby access a remote host computer without having to incur substantial long distance telephone fees. For this purpose, a modem 414 affiliated with data network 412 may suitably establish the telephone/data network interface. In yet a further alternative, LEC 402 of FIG. 4 may also route the call to and/or through a long distance telephone carrier, and thereafter to data network 412 to thereby establish communication between terminal 200 and host 410.

Figure 5:
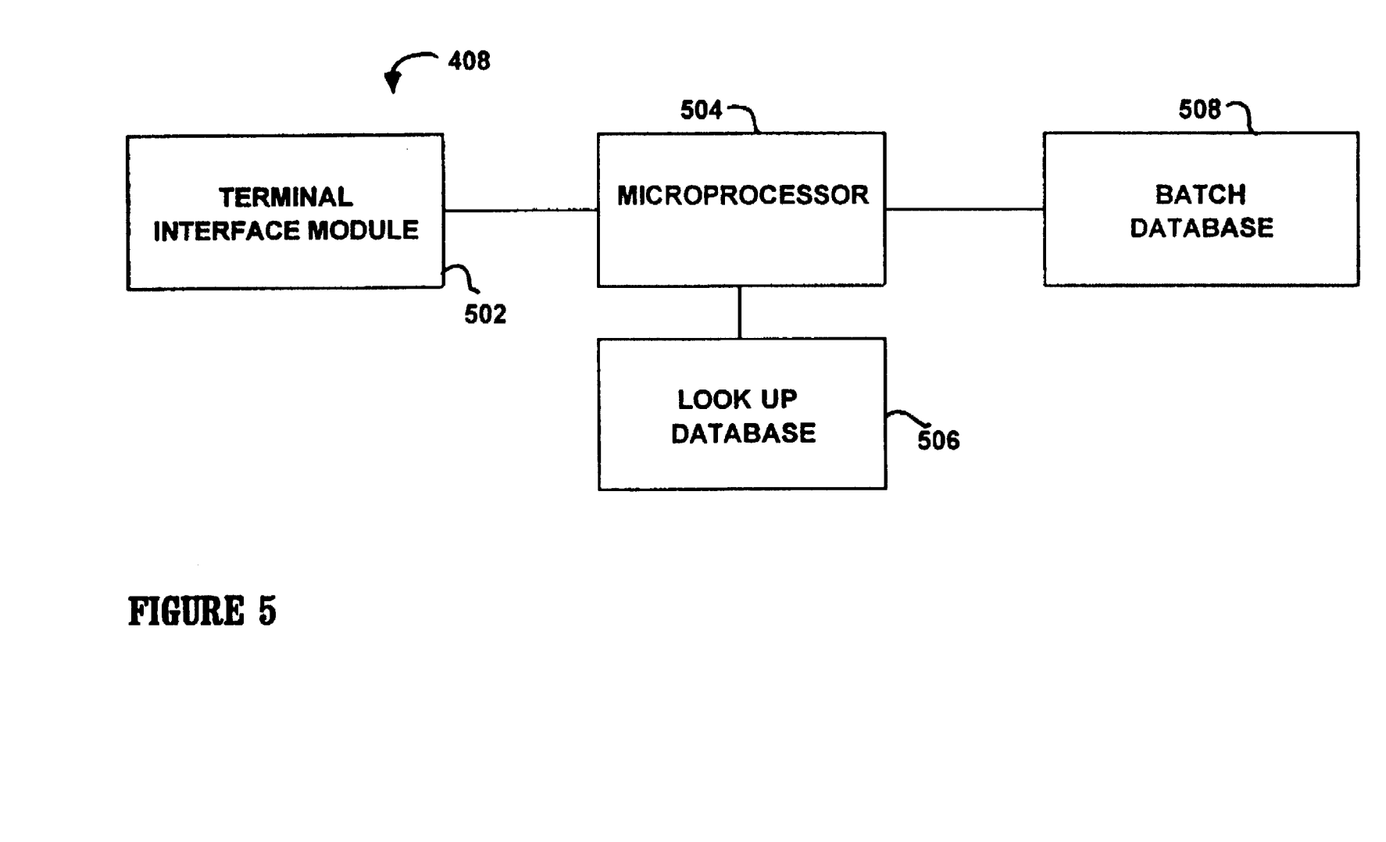
FIG. 5 is a schematic block diagram of an exemplary APFE module in accordance with a preferred embodiment of the present invention.

Referring now to FIG. 5, APFE 408 suitably comprises a terminal interface module 502, a processing module 504, a look-up database 506, and a batch database 508. As discussed briefly above, processing module 504 may comprise a dedicated processor and/or data processing software which is physically remote from host computer 410 if APFE comprises a standalone unit; alternatively, processor 504 may comprise a shared processor or may even comprise a part of host computer 410 in the event APFE module 408 is logically or physically integral with the host.

With continued reference to FIG. 5, terminal interface module 502 suitably coordinates dialogue between APFE 408 and terminal 200.

Look-up database 506 includes, among other things, various look-up tables, which advantageously include information and data pertaining to the various remote POS terminals configured to communicate with APFE 408. More particularly, prior art POS terminals typically construct a message which is sent to the host in the course of effecting a financial transaction. Of the many fields within a message, various of these fields correspond to information pertaining to the merchant and POS terminal from which the message was sent. In accordance with a preferred embodiment of the present invention, the data and information pertaining to the POS terminal, the merchant at which the POS terminal resides, and other related data may be conveniently stored in look-up database 506 and thus need not be resident at the POS terminal; rather, only a basic ID "key" need be resident at the POS, which ID may be conveniently employed to interrogate database 506 and thereby access all the relevant information pertaining to the POS.

Specifically, look-up database 506 suitably includes, inter alia, for each POS terminal, indicia of the merchant name, address, phone number, type of business, proprietor and/or contact person and relevant details with regard to the particular hardware configuration of the POS terminal. This data is stored and may be accessed in accordance with a unique fixed terminal ID associated with a particular POS terminal 200. In this way, when POS terminal 200 transmits each terminal ID number to APFE 408, APFE 408 may conveniently use this terminal ID number as an argument to interrogate look-up database 506 and thereby ascertain any and all relevant information pertaining to the POS terminal (and merchant) from which a message is sent.

With continued reference to FIG. 5, batch database 508 is suitably configured to store the various transaction records corresponding to each transaction effected by APFE 408 for a particular business cycle (typically a calendar day).

More particularly, presently known POS terminals typically store, for a particular business day, a record of each transaction effected by the terminal during that day. At the end of the day, it may be convenient for the merchant to reconcile with and submit a record of that day's transactions to the host computer to facilitate payment and other accounting matters. For this purpose, each transaction record is stored in a batch database in the POS terminal, and the aggregate data for that day's POS transactions (as recorded in the POS terminal) are compared with the aggregate data for that day's transactions as recorded by the host computer. To the extent any discrepancy exists between the aggregate data stored at the terminal and the aggregate data for that terminal stored at the host, the merchant may reconcile such discrepancies on a day-by-day basis. This aggregate data reconciliation is alternately referred to in the industry as batch capture, terminal capture, or batch processing.

In accordance with a preferred embodiment of the present invention, batch processing for a particular POS terminal may be implemented without the need to store aggregate transaction data at the POS terminal. Rather, APFE 408 may be suitably configured to store within batch database 508, for each POS terminal 200 associated with APFE 408, a batch file which contains relevant data for each transaction effected by that POS terminal for a particular business cycle (e.g., on a calendar day basis). In particular, the batch data may include, for each transaction performed by each POS terminal, the date and time of the transaction (e.g., when the transaction was initiated by the POS terminal), the amount of the transaction, the nature of the transaction, and the like. In accordance with the particularly preferred embodiment of the present invention, each batch file is addressed in accordance with the unique terminal ID number associated with each POS terminal 200.

An alternate data reconciliation scheme prevalent in the industry is referred to as host capture, wherein the authorization for a transaction as well as the transaction itself is effected with the host on a substantially real time basis. Thus, it is not necessary for the POS device to store batch data, either locally or at the APFE in the context of the present invention, since the host has an essentially real time record of the day's transactions. At the end of the day, the POS device merely reconciles with the host to account for any discrepancies which may have occurred, for example due to an error in transmission of a message from the host to the POS device or vice versa.

A third alternative scheme is sometimes referred to as the shadow file system. In a shadow file system, a host capture system is employed, as well as a POS capture system. At the end of the day, if the totals match, there is no need to reconcile via a batch processing scheme. If, on the other hand, a discrepancy is noted at the time of reconciliation, the "backup" POS capture system may be used to effect a batch processing reconciliation.

A further hybrid system may also be employed, wherein a particular POS may obtain authorization from a first host, yet effect various transactions from one or more different hosts. Finally, reconciliation may be performed with any one of the foregoing hosts or even with yet a different host, as desired.

In accordance with one aspect of the present invention, the functionality implemented by APFE 408 may be suitably configured to accommodate any one or more of the foregoing authorization, transaction, and reconciliation schemes, as desired.

Figure 6:
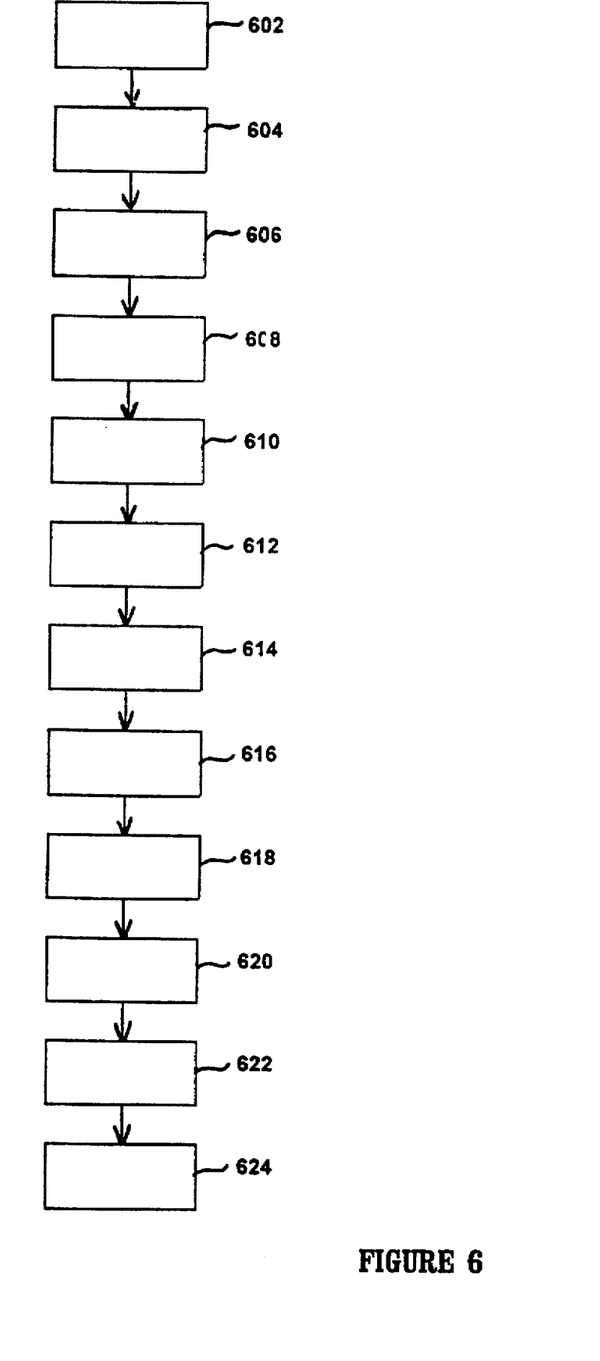
FIG. 6 is a flow diagram of an exemplary transaction performed in accordance with the POS scheme shown in FIGS. 2 through 5.

Referring now to FIG. 6, the operation of the salient components set forth in FIGS. 1-5 during a typical transaction are conveniently set forth in flow chart form.

More particularly, the transaction process is conveniently initiated by remote terminal 200 (step 602), for example by swiping a magnetic encoded transaction card through the card swipe slot associated with card swipe circuit 216; alternatively the process may be initiated by depressing an appropriate key or combination of keys on keypad unit 220 (see FIG. 2). Upon initiation of the transaction process, controller 210 of POS terminal 200 (FIG. 2) instructs modem 204 to establish communication between POS terminal 200 and APFE 408 (or host 410) (step 604). Once communication is established, POS terminal 200 suitably transmits an initial, predetermined data packet to APFE 408 (step 606), for example including the terminal ID number and credit card number pertaining to this particular transaction. Upon receipt of the terminal ID number APFE 408 may suitably access the integrated look-up database 506 (step 608) to determine any additional relevant information pertaining to terminal 200. Depending on the nature of the transaction requested by terminal 200, APFE 408 issues one or more prompts to terminal 200 (step 610). For example, APFE 408 may prompt terminal 200 to enter a transaction amount (e.g., the dollar amount of the sale for which a credit card transaction is desired), or any other information required by APFE 408 to effect the desired transaction. Upon receipt of the prompt command from APFE 408, terminal 200 suitably displays the prompt (e.g., via the display module 218) or otherwise solicits input from the merchant or the consumer. In response to the user prompt, the merchant (or consumer) enters the appropriate transaction amount or other data requested by APFE 408 (step 614), and the interactive prompt/data entry sequence continues until APFE 408 receives all information necessary from POS terminal 200 to effect the transaction request.

APFE 408 assembles a message to be transmitted to the host based on the information received from the POS terminal as appropriately augmented by data retrieved from look-up database 506 (step 616). APFE 408 then transmits this request message to host 410 (step 618). Host port 10 thereafter responds to the message request, for example as the host would respond to a typical prior art request message from presently known POS terminals. That is, the fact the request message may have been assembled by APFE 408 rather than by a POS terminal is suitably transparent to the host computer.

Upon receipt of the response message from the host computer (step 620), indicia of the response message (e.g., the appropriate display and print data) are transmitted by APFE 408 to POS terminal 200 (step 622), whereupon appropriate action is taken by the POS terminal (step 624). In particular, such appropriate action may include displaying an authorization message, printing a receipt, rendering advice, generating further instructions, or any combination thereof.

With continued reference to FIG. 6, APFE 408 may also request a PIN or other data either from the merchant operating POS terminal 200 or from the consumer purchasing goods or services from the merchant. In this case, such a PIN request (step 610) may be responded to directly by the consumer as opposed to the merchant, for example by entering a PIN number on PIN pad 226 (FIG. 1) (step 614). In accordance with an alternate embodiment of the present invention, the prompting for and entry of the PIN may constitute the predicate for causing modem 204 (FIG. 1) to establish communication between POS terminal 200 and the host computer (or APFE). In this alternate embodiment, certain initial user prompts and logical steps may be preloaded into the POS terminal, such that the terminal does not dial up the host (or APFE) until the correct PIN is entered.

It will be appreciated that the flow chart set forth in FIG. 6 may be adapted and augmented, as appropriate, depending on the nature of the transaction requested by POS terminal 200. For example, while the algorithm shown in FIG. 6 is set forth in the context of a purchase of goods or services from a merchant, it will be appreciated that the present invention as described herein may conveniently accommodate any desired transaction, for example an account status update, an end of day settlement/reconciliation, a request for advice, and the like. For this purpose, APFE 408 is suitably configured to select and execute one or more of a plurality of operational modes or algorithms, depending on the nature of the transaction requested by a particular POS terminal configured to cooperate with APFE 408.

In the event a merchant desires to effect a settlement transaction of the type described above, it may be desirable for the merchant to first reconcile his own personal records for a particular day's transactions with the aggregate data maintained by APFE 408 in batch database 508 before APFE 408 constructs a settlement request message for transmission to host 410. Specifically, it may be desirable to adapt the process set forth in FIG. 6 to permit the merchant to conveniently scroll through the batch file maintained for a particular POS terminal to reconcile and/or amend the batch file for that POS terminal for that particular day, and to thereafter effect reconciliation or settlement with the host. For this purpose, steps 610-614 may include, inter alia, successive requests from APFE 408 to the merchant to enter specific data (time of day, amount of transaction, and the like) for one or more of the transaction records for which reconciliation is sought.

As briefly discussed above, APFE 408 (see FIG. 4) may be integral with host 410 or may comprise a separate hardware unit. Inasmuch as many host computers take the form of a mainframe computer, software implementation of an APFE functional module within host computer 410 may be conveniently effected. Alternatively, APFE may comprise a standalone PC configured to effect a communication link with host 410 via a suitable interface (e.g., modem). This PC embodiment of APFE 408 may be particularly useful in circumstances where a plurality of different groups of POS terminals desire to interface with a single host, further reducing the per merchant cost of implementing the system which is the subject of the present invention.

Although the present invention is set forth herein in the context of the appended drawing figures, it will be appreciated that the invention is not limited to the specific forms shown. For example, although a preferred embodiment of the invention is set forth in the context of a plurality of POS transaction terminals which utilize a common APFE, the invention may also be applied to various other devices, such as cash registers, PCs, and the like. More particularly, it may be desired to incorporate enhanced functionality into cash registers typically used by merchants and the like. However, highly sophisticated cash registers become cost prohibitive for many small business operators. By employing the principles of the present invention in the context of cash registers and other remotely distributed devices, the enhanced functionality associated with higher cost devices may be provided through individual merchants at a relatively low cost, by placing the hardware and/or software which implements the advanced functionality in a remote APFE which is shared by a plurality of users of the devices which access the APFE. These and other modifications in the design and arrangement of the various components, processes, steps, and descriptions thereof as set forth herein may be made without departing from the spirit and scope of the present invention as set forth in the appended claims.

I claim:

1. A method for effecting a financial transaction between a remote point-of-sale (POS) terminal and a host computer, comprising the steps of:

swiping a magnetically encoded transaction card through a card swipe slot associated with said POS device;

effecting communications, via a communications circuit resident within said POS device, between said POS device and an said application processing front end (APFE) module disposed between said POS device and said host;

transmitting a first data packet from said POS device to APFE, said first data packet including indicia of said POS device;

accessing a database associated with said APFE using said indicia of said POS device;

transmitting a second data packet including indicia of a user prompt from said APFE to said POS device, said second data packet being generated at, and transmitted from, said APFE;

in response to user input at said POS device, transmitting a third data packet indicative of a particular financial transaction from said POS device to said APFE;

assembling an authorization request at said APFE, in accordance with said third data packet and information retrieved from said database, and transmitting said authorization request from said APFE to said host;

in response to said authorization request, transmitting a response message from said host to said APFE;

transmitting a fourth data packet indicative of said response message from said APFE to said POS device, and displaying, at said POS device, human readable indicia of said fourth data packet.

2. The method of claim 1, wherein said swiping step automatically causes said effecting communications step.

3. The method of claim 1, wherein said step of transmitting a second data packet comprises one of:

retrieving indicia of a user prompt from a user prompt database associated with said POS device based on at least a portion of said second data packet as an argument for retrieval, from said user prompt database; and retrieving indicia of said user prompt from said second data packet and displaying said user prompt at said user POS device.

4. The method of claim 1, wherein said user input is effected at said POS device via at least one of:

manual entry of data via a keypad;

speaking into a voice processing circuit associated with said POS device; and speaking information into a telephone circuit associated with said POS device.

5. The method of claim 1, wherein said third data packet comprises indicia of the monetary amount of a proposed financial transaction.

6. The method of claim 1, wherein said step of assembling an authorization request is substantially performed at said POS device.

7. The method of claim 1, wherein said response message comprises one of a transaction approval message and a transaction denial message.

8. The method of claim 1, wherein said step of displaying human readable indicia of said fourth data packet comprises driving an LCD.

9. The method of claim 1, further comprising the step of preloading at least one initial user prompt in said POS device.

10. A system for effecting financial transactions, comprising:

a POS device comprising a POS processor, a POS communications interface, and a user interface;

a host computer comprising a host processor;

an application processing front end (APFE) comprising first means for communicating with said POS device, second means for communicating with said host computer, and a database;

wherein, said POS processor is configured to establish communication with said APFE in response to predetermined user input relating to a financial transaction, said APFE is configured to access said database, assemble an authorization request message, and to transmit said authorization request message to said host computer in response to a predetermined communication from said POS device, and said host computer is configured to transmit an authorization response message back to said APFE in response to said authorization request message.

11. The system of claim 10, wherein said user interface comprises an alphanumeric keypad.

12. The system of claim 10, wherein said user interface comprises a plurality of keys, at least some of which correspond to predetermined functions.

13. The system of claim 10, wherein said APFE comprises a software module integral with said host computer.

14. The system of claim 10, wherein said APFE comprises a hardware module physically, interposed between said POS device and said host computer.

15. The system of claim 10, wherein said APFE further comprises a message circuit configured to generate messages for transmission to said host computer.

16. The system of claim 10, wherein said POS device includes means for assembling data message packets for transmission to said APFE.

17. The system of claim 10, wherein said POS device further comprises a card swipe slot configured to activate said communications interface upon receipt of a card.

18. The system of claim 10, wherein said POS device comprises a housing on the order of about 110 mm in width, 200 mm in length, and 40 mm in height.

19. The system of claim 10, wherein said database comprises at least one of a batch database and a look up database.

* * * * *